US006992779B2

(12) United States Patent
Ueki

(10) Patent No.: US 6,992,779 B2
(45) Date of Patent: Jan. 31, 2006

(54) INTERFEROMETER APPARATUS FOR BOTH LOW AND HIGH COHERENCE MEASUREMENT AND METHOD THEREOF

(75) Inventor: Nobuaki Ueki, Saitama (JP)

(73) Assignee: Fujinon Corporation, Saitama (JP)

( * ) Notice: Subject to any disclaimer, the term of this patent is extended or adjusted under 35 U.S.C. 154(b) by 220 days.

(21) Appl. No.: 10/745,707

(22) Filed: Dec. 29, 2003

(65) Prior Publication Data

US 2004/0141184 A1 Jul. 22, 2004

(30) Foreign Application Priority Data

Jan. 20, 2003 (JP) ............................ 2003-011368

(51) Int. Cl.
*G01B 9/02* (2006.01)
(52) U.S. Cl. ...................................... 356/512; 356/497
(58) Field of Classification Search ................ 356/489, 356/495, 479, 497, 511–515
See application file for complete search history.

(56) References Cited

U.S. PATENT DOCUMENTS 6,781,700 B2 * 8/2004 Kuchel ....................... 356/512
6,879,402 B2 * 4/2005 Kuchel ....................... 356/513

FOREIGN PATENT DOCUMENTS

JP 09-021606 1/1997
JP 2004-37165 2/2004

OTHER PUBLICATIONS

Hotate, Kazuo, et al., "Photonic Sensing by Synthesis of Coherence Function", Proceedings of 15th Meeting on Lightwave Sensing Technology, May 1995, pp. 75-82, Japan.

* cited by examiner

*Primary Examiner*—Gregory J. Toatley, Jr.
*Assistant Examiner*—Patrick Connolly
(74) *Attorney, Agent, or Firm*—Snider & Associates; Ronald R. Snider

(57) ABSTRACT

A Fizeau interferometer apparatus is used for both low and high interference measurement. When irradiating a reference surface and a sample with a low coherent luminous flux, a path-matching passage divides the low coherent luminous flux into first and second paths, while the optical path length difference between the respective luminous fluxes passed through the two paths equals twice the optical distance between the reference surface and the sample. When irradiating the reference surface and the sample with a high coherent luminous flux, the luminous flux is made incident on the sample side of the path-matching passage at a position coaxial with the low coherent luminous flux.

13 Claims, 5 Drawing Sheets

INTERFEROMETER APPARATUS FOR BOTH LOW AND HIGH COHERENCE MEASUREMENT AND METHOD THEREOF

RELATED APPLICATIONS

This application claims the priority of Japanese Patent Application No. 2003-011368 filed on Jan. 20, 2003, which is incorporated herein by reference.

BACKGROUND OF THE INVENTION

1. Field of the Invention

The present invention relates to an interferometer apparatus for observing a wavefront form from a sample, an unequal optical path length interferometer apparatus such as that of Fizeau type in particular. Specifically, the present invention relates to an interferometer apparatus for both low and high coherence measurement, which can interferentially measure a surface wavefront form and a transmitted wavefront form of a sample such as a thin, flat transparent sheet, e.g., glass for liquid crystal, and various optical filters and windows, and a sphere, e.g., ball lens, at the same time.

2. Description of the Prior Art

As an example of techniques for measuring a plane parallel glass sheet, it has conventionally been known to use a Fizeau interferometer mounted with a highly coherent laser light source. In this technique, since highly coherent laser light is used, not only interference fringes of a sample surface in the plane parallel glass sheet, but also those of a non-sample surface on the side opposite from the sample surface may occur. Namely, a Fizeau interferometer in which reference light and object light yield respective optical path length differences different from each other (unequal optical path length interferometer) uses a highly coherent laser luminous flux, whereby optical interference may occur between the reference surface and the sample surface, between the reference surface and the non-sample surface, and between the sample surface and the reference surface. Since only the optical interference between the reference surface and the sample surface is usually desired, interference fringes occurring between the other surfaces become noises, which makes it difficult to measure the surface of the sample surface with high accuracy.

As a technique for suppressing such interference fringe noises, it has been known to coat the non-sample surface with a refractive index matching oil, and attach a light-scattering sheet thereon, so as to optically extinguish the non-sample surface and handle thus attached light-scattering sheet as if a non-sample surface, thereby preventing interference fringes from occurring due to the optical interference between the non-sample surface and other surfaces.

However, such an interference fringe noise suppressing technique requires an oil to be applied to one surface of a sample though it is a non-sample surface, which is not only troublesome but also smudges the sample. Further, a thin sample may change the shape of its sample surface because of such processing as coating with the oil and attaching of the light-scattering sheet.

In this regard, the assignee of the present invention has already proposed a technique disclosed in Japanese Unexamined Patent No. HEI 9-21606 (hereinafter referred to as "Patent Document 1").

The interferometer for measuring a transparent thin sheet disclosed in Patent Document 1 provides a path-matching optical system for setting a coherent length of measurement light shorter than a predetermined length and bypassing a part of the measurement light, so that no optical interference occurs except for that between the reflected light from the sample surface derived from forwardly advancing measurement light without bypassing and the reflected light from the reference light derived from the bypassed measurement light, whereby a clear interference image without noises can be obtained in a quite simple configuration.

In Fizeau interferometer apparatus, light from a light source is turned into parallel light, which illuminates a reference plate, whereas a sample separated by a predetermined distance from the reference plate in parallel therewith is irradiated with the parallel light transmitted through the reference plate, and interference fringes are formed between the reflected light from a reference surface of the reference plate and the reflected light from a sample surface of the sample. As compared with interferometer apparatus such as those of Michelson type, Fizeau interferometer apparatus are advantageous in that highly accurate measurement can be carried out in a simple configuration, and so forth. Their greatest attraction lies in that they can easily measure transmitted wavefronts of transparent samples, e.g., internal distortions and refractive index distributions of transparent samples.

However, the interferometer of the above-mentioned Patent Document 1 is hard to measure transmitted wavefronts of transparent samples in terms of operations, and thus may not fully take advantage of Fizeau interferometer apparatus.

SUMMARY OF THE INVENTION

In view of such circumstances, it is an object of the present invention to provide an interferometer apparatus for both low and high coherence measurement, which can favorably measure a transmitted wavefront of a transparent sample, while being able to yield noiseless clear interference fringe images by preventing interference fringes from being generated by reflected light from the rear face of the sample when measuring a surface wavefront from the sample surface.

When measuring the distance between predetermined parts of an optical member with high accuracy, for example, it has been known to carry out measurement while a contrast peak position of interference fringes obtained upon irradiation with low coherent light is taken as a reference surface. When the low coherent light is used alone, however, it takes much labor to find a position where interference fringes emerge or their contrast peak position, which demands a technique for alleviating the labor by using a high coherent luminous flux together therewith.

Also in view of such circumstances, it is another object of the present invention to provide an interferometer apparatus for both low and high coherence measurement in a simple configuration, which can greatly alleviate labor when carrying out highly accurate length measurement by using light-wave interference, as compared with the case using the low coherent light alone.

The present invention provides an interferometer apparatus for both low and high coherence measurement, the interferometer apparatus being of Fizeau type adapted to irradiate a reference surface with light from a light source, irradiate a sample separated by a predetermined distance from the reference surface with light transmitted through the reference surface, and yield wavefront information of the sample according to interference of light between the reference surface and the sample;

wherein, when carrying out low coherence measurement by using a low coherent luminous flux outputted from the light source, the sample is interferentially measured such that the low coherent luminous flux is passed through a path-matching passage for dividing the low coherent luminous flux into first and second paths, while the optical path length difference between the respective luminous fluxes passed through the two paths equals twice the optical distance between the reference surface of the interferometer apparatus and the sample; and wherein, when carrying out high coherence measurement by using a high coherent luminous flux outputted from the light source, the sample is interferentially measured such that the high coherent luminous flux is made incident on at least the sample side of the path-matching passage at a position coaxial with the low coherent luminous flux, while the reference surface and the sample are irradiated with the high coherent luminous flux.

The light source may comprise a first light source unit for emitting the low coherent luminous flux and a second light source unit for emitting the high coherent luminous flux.

In this case, it is preferred that a luminous flux switching operation for preventing the sample from being irradiated with the high coherent luminous flux be performed when carrying out the low coherence measurement.

The first light source unit may comprise a superluminescent diode.

Preferably, in the above-mentioned case, light-deflecting means for guiding interference light toward imaging means is disposed between the path-matching passage and the reference surface, whereas the luminous flux switching operation is effected by luminous flux selecting means disposed between the first light source unit and the light-deflecting means, the luminous flux selecting means allowing the sample to be irradiated with the high coherent luminous flux alone when carrying out the high coherence measurement and allowing the sample to be irradiated with the low coherent luminous flux alone when carrying out the low coherence measurement.

The high coherent luminous flux and the low coherent luminous flux may pass a common optical path on the light source side of the path-matching passage.

In this case, it is preferred that one of the first and second paths of the path-matching passage be provided with a light-shielding member for preventing the luminous flux from passing when carrying out the high coherence measurement.

Preferably, when the light source comprises a first light source unit for emitting the low coherent luminous flux and a second light source unit for emitting the high coherent luminous flux, luminous flux selecting means integrated with a reflecting member for guiding one of the high and low coherent luminous fluxes into the optical path of the other and a light-shielding member for blocking the other luminous flux is detachably inserted in the optical path, the luminous flux selecting means being disposed between light-deflecting means for emitting the interference light toward the imaging means and the path-matching passage, the light-deflecting means being disposed between the path-matching passage and the reference surface.

The light source may comprise a single light source unit for emitting both the low coherent luminous flux and the high coherent luminous flux.

In this case, it is preferred that one of the first and second paths of the path-matching passage be provided with a light-shielding member for preventing the luminous flux from passing when carrying out the high coherence measurement.

The interferometer apparatus may be configured such that at least a light source for outputting the low coherent luminous flux is capable of wavelength scanning for causing laser light of a single longitudinal mode to oscillate; the laser light from the light source is modulated into a plurality of wavelengths in a period sufficiently shorter than a light accumulation period of a device for receiving interference fringes; the reference surface and the sample are irradiated with measurement light comprising the laser light modulated into the plurality of wavelengths; interference light generated by light from the sample and light from the reference surface is received by the device; and the interference light is integrated for the light accumulation period.

The optical path length difference between the two paths constituting the path-matching passage may be variable and measurable.

The interferometer apparatus may further comprise optical path length difference changing means for changing the optical path length difference between the two paths constituting the path-matching passage; focus position adjusting means for adjusting a focus position of an imaging system for capturing interference fringes caused by light from the reference surface and sample; and control means for driving the optical path length changing means and focus position adjusting means in synchronization with each other such that both the optical path length difference and focus position attain respective optimal values.

Preferably, the interferometer apparatus is a Fizeau interferometer apparatus adapted to measure any of planar and spherical samples.

Also, the present invention provides a measuring method in the interferometer apparatus for both low and high coherence measurement adapted to measure a spherical sample, the method successively comprising:

a first step of irradiating the sample with the high coherent luminous flux as measurement light by way of the reference surface of a reference lens in the interferometer apparatus, moving the sample along an optical axis in thus irradiated state so as to detect a position yielding a minimum number of interference fringes caused by light from the reference surface and sample, and setting the sample at thus detected position;

a second step of switching the measurement light to the low coherent light, irradiating the sample with the low coherent light by way of the reference surface of the reference lens, changing the optical path length difference between the respective luminous fluxes passed through the two paths of the path-matching passage so as to detect a contrast peak position yielding a maximum contrast in interference fringes obtained, and determining a first adjustment amount as an adjustment amount of means for adjusting the optical path length difference at the time of detection;

a third step of irradiating the sample with the high coherent luminous flux as the measurement light by way of the reference surface of the reference lens, moving the sample along the optical axis in thus irradiated state so as to detect a position yielding a minimum number of interference fringes caused by light from the reference surface and sample, and setting the sample at thus detected position;

a fourth step of switching the measurement light to the low coherent light, irradiating the sample with the low coherent light by way of the reference surface of the reference lens, changing the optical path length difference between the respective luminous fluxes passed through the two paths of the path-matching passage so as to detect a contrast peak position yielding a maximum contrast in interference fringes obtained, and determining a second adjustment amount as an adjustment amount of means for adjusting the optical path length difference at the time of detection; and a fifth step of calculating a difference between the first adjustment amount obtained by the second step and the second adjustment amount obtained by the fourth step, and attaining curvature information of the sample according to a result of calculation.

DESCRIPTION OF THE PREFERRED EMBODIMENTS

In the following, embodiments of the present invention will be explained with reference to the drawings.

First Embodiment

Figure 1:
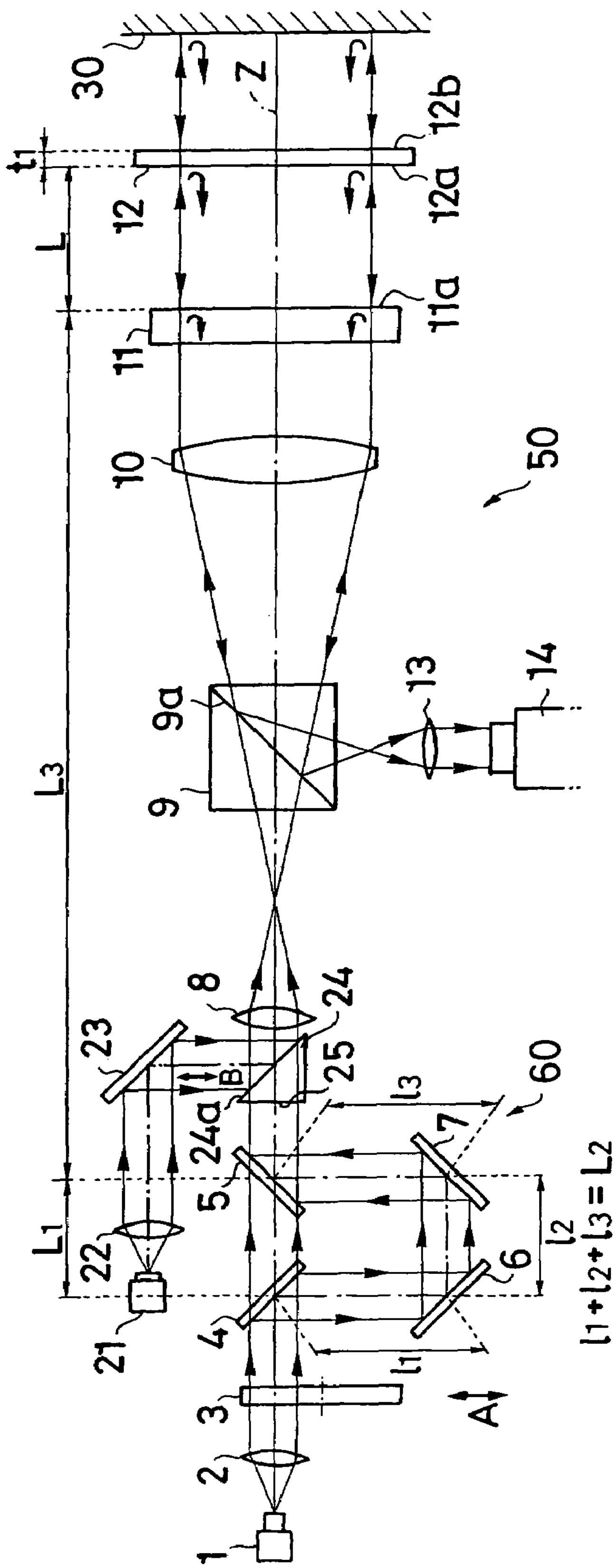
FIG. 1 is a schematic diagram showing the interferometer apparatus for both low and high coherence measurement in accordance with a first embodiment of the present invention.

FIG. 1 is a schematic view showing the interferometer apparatus for both low and high coherence measurement in accordance with a first embodiment of the present invention.

This interferometer apparatus carries out low coherence measurement for the form of a surface 12*a* of a sample 12 and the like by using a low coherent luminous flux outputted from a low coherent light source 1, and also measures a transmitted wavefront of the sample 12 by using a high coherent luminous flux outputted from a high coherent light source 21 and guided such that a part of its optical path is coaxial with the low coherent luminous flux, thereby effecting interference measurement concerning an internal refractive index distribution and the like. When carrying out high coherence measurement by using the high coherent luminous flux outputted from the light source, the high coherent luminous flux is made incident on at least the sample 12 side of a path-matching passage at a position coaxial with the low coherent luminous flux.

Switching between the low coherent luminous flux outputted from the low coherent light source 1 and the high coherent luminous flux outputted from the low coherent light source 21 is effected by an operation in which a total reflection prism 24 is inserted into/removed from an optical path.

Namely, when carrying out the low coherence measurement by irradiating the sample 12 with the low coherent luminous flux outputted from the low coherent light source 1, the total reflection prism 24 is moved in directions of arrow B, so as to be retracted from the optical path between a half mirror 5 and a condenser lens 8.

When carrying out the high coherence measurement by irradiating the sample 12 with the high coherent luminous flux outputted from the high coherent light source 21, the total reflection prism 24 is moved in directions of arrow B, so as to be inserted into the optical path between the half mirror 5 and the condenser lens 8, whereby the luminous flux from the high coherent light source 21 can be reflected by a total reflection surface 24*a* toward the sample 12.

One of side face parts of the total reflection prism 24 (a side face part oriented to the light source 1 when the total reflection prism 24 is inserted into the optical path) acts as a light-shielding part which prevents the low coherent luminous flux outputted from the low coherent luminous flux 1 from being emitted toward the sample 12 when the total reflection prism 24 is inserted into the optical path.

Preferably, the operation of inserting/removing the total reflection prism 24 into/from the optical path between the half mirror 5 and the condenser lens 8 is carried out in synchronization with an operation of switching between low coherence measurement and high coherence measurement performed by an operator from the outside.

Apparatus Configuration

In this interferometer apparatus, measurement light outputted from the low coherent light source 1 is turned into parallel light by a collimator lens 2. The beam diameter of this parallel light is enlarged by the condenser lens 8 and a collimator lens 10. Then, a transparent reference plate 11 and a thin glass sheet (sample with a thickness of $t_1$) 12 are irradiated with the light having the enlarged beam diameter.

At the time of low coherence measurement, respective reflected light components from the reference surface 11*a* of the reference plate 11 and a sample surface 12*a* of the sample 12 derived from the measurement light interfere with each other, and are perpendicularly reflected by a half mirror surface 9*a* of a half prism 9, so as to form an interference fringe image on a CCD within an imaging camera 14 by way of an imaging lens 13. According to interference image information upon photoelectric conversion by the CCD, an interference fringe image is formed on an image display unit (not depicted) such as CRT. From this image, the surface form of the sample surface 12*a* or the like is measured.

At the time of high coherence measurement, on the other hand, the sample 12 is irradiated with measurement light from the high coherent light source 21 comprising a laser diode (LD), whereas a light component transmitted through the sample 12 and then reflected by a reference reflecting surface 20 positioned on the sample side thereof so as to reach the reference surface 11*a* after passing through the sample 12 again is utilized. Namely, according to interference light caused by respective reflected light components from the reference surface 11*a* of the reference plate 11 and the reference reflecting surface 30, an interference fringe image is obtained as in the low coherence measurement mentioned above. From thus obtained interference fringe image, transmitted wavefront information of the sample, i.e., the internal stress or refractive index distribution of the sample 12, is measured.

When measuring a sample by using a Fizeau interferometer apparatus, a gap is inevitably formed between the reference surface and the sample surface, which makes it necessary to use measurement light having a large coherence length. Therefore, when measuring the sample 12 made of a thin glass sheet, reflected light from the rear face 12*b* of the sample 12 yielding an optical path length difference of about two times the optical length nt of the sample 12 in the thickness direction with respect to the reflected light from the sample surface 12*a* interferes with reflected light from the reference surface 11*a* and reflected light from the sample surface 12*a*. Interference fringes generated by such reflected light from the rear face 12*b* of the sample 12 are superposed on original interference fringes, whereby the accuracy in measurement decreases.

Therefore, at the time of low coherence measurement, this embodiment sets the measurement light from the light source 1 so as to make it attain a coherence length smaller than twice the optical distance between both sides 12*a*, 12*b* of the sample 12. Specific examples of the light source 1 include SLD (superluminescent diode), halogen lamp, and high-voltage mercury lamp (having a coherence length of 1 μm, for example).

Inserted in a parallel luminous flux area between the collimator lens 2 and the condenser lens 8 is a path-matching optical system (hereinafter also referred to as path-matching passage 60), composed of two half mirrors 4, 5 and two total reflection mirrors 6, 7, for bypassing a part of the measurement light (with two paths).

A part of the measurement light is perpendicularly reflected by the half mirror 4 so as to be separated from the rest of the measurement light. Thus reflected light component is perpendicularly reflected by the total reflection mirrors 6, 7 in succession, and then by the half mirror 5, so as to recombine with the rest of the measurement light. Here, the optical path length $L_2$ ($L_2=1_1+1_2+1_3$) of the bypassed measurement light from the half mirror 4 to the half mirror 5 is longer than the optical path length $L_1$ of the measurement light transmitted through the half mirror 4 between the half mirrors 4 and 5 by the length of $1_1+1_3(1_1=1_3)$, since the distance $L_1$ between the two half mirrors 4, 5 equals the distance between the two total reflection mirrors 6, 7. As mentioned above, the length of $1_1+1_3$ is adjusted so as to equal twice the distance L between the reference surface 11*a* of the reference plate 11 and the sample surface 12*a* of the sample 12.

The high coherence measurement and low coherence measurement in the first embodiment will now be explained in succession.

High Coherence Measurement

When carrying out the high coherence measurement by irradiating the sample 12 with a high coherent luminous flux outputted from the high coherent light source 21, the total reflection prism 24 is initially set so as to be positioned in the optical path between the half mirror 5 and the condenser lens 8.

In this interferometer apparatus, the measurement light outputted from the high coherent light source 21 is turned into parallel light by a collimator lens 22. The beam diameter of the parallel light is enlarged by the condenser lens 8 and the collimator lens 10. The transparent reference plate 11, the sample 12 made of a thin glass sheet, and the reference reflecting surface 30 are irradiated with the light having the enlarged beam diameter. Here, the reference surface 11*a* of the reference plate 11 and the reference reflecting surface 30 are disposed orthogonal to the optical axis Z, whereas the surfaces 12*a*, 12*b* of the sample 12 have respective normals slightly inclined with respect to the optical axis Z. As a consequence, the reflected light from the reference reflecting surface 30 goes back the incoming path, thereby interfering with the reflected light from the reference surface 11*a*. By contrast, respective reflected light components from the surfaces 12*a*, 12*b* of the sample 12 do not go back their incoming paths, and thus do not interfere with the reflected light from the reference surface 11*a*.

The interference light caused by the reflected light from the reference surface 11*a* and the reflected light from the reference reflecting surface 30 is perpendicularly reflected by the half mirror surface 9*a* of the half prism 9, so as to form an interference fringe image on the CCD within the imaging camera 14 by way of the imaging lens 13. According to interference image information upon photoelectric conversion by the CCD, an interference fringe image is formed on an image display unit (not depicted) such as CRT.

The reflected light from the reference reflecting surface 30 passes through the sample 12 twice, and thus carries transmitted wavefront information within the sample, e.g., information about internal stress strain and refractive index distribution, whereby such transmitted wavefront information appears in the interference fringe image displayed on the image display unit (not depicted) such as CRT.

Low Coherence Measurement

When carrying out the low coherence measurement by using a low coherent luminous flux outputted from the low coherent light source 1, the total reflection prism 24 is initially set at a position retracted from the optical path between the half mirror 5 and the condenser lens 8.

Interference between reflected light components from the surfaces 11*a*, 12*a*, 12*b* derived from the measurement light will now be explained. In the following expressions, it is assumed that the optical path length from the half mirror 5 to the reference surface 11*a* of the reference plate 11 is $L_3$, the refractive index of the sample 12 is n, and the thickness of the sample 12 is t.

Though not explained in particular, the reflected light from the reference reflecting surface 30 can be regarded as the same as the reflected light from the sample rear face 12*b* in this case.

Here, the respective optical lengths of the reflected light components from the surfaces 11*a*, 12*a*, 12*b* derived from the measurement light straightly advanced from the half mirror 4 to the half mirror 5 (from the half mirror 4 to the reference surface 11*a* by way of the respective surfaces 11*a*, 12*a*, 12*b*; ditto in the following) are represented as follows:

reflected light from the reference surface $\mathbf{11}a=L_1+L_3$ (1)

reflected light from the reference surface $\mathbf{12}a=L_1+L_3+2L$ (2)

reflected light from the sample rear face $\mathbf{12}b=L_1+L_3+2L+2nt$ (3)

The respective optical path lengths of reflected light components from the surfaces 11*a*, 12*a*, 12*b* derived from the measurement light bypassed from the half mirror 4 to the half mirror 5 are represented as follows:

reflected light from the reference surface $\mathbf{11}a=L_2+L_3$ (4)

reflected light from the reference surface $\mathbf{12}a=L_2+L_3+2L$ (5)

reflected light from the sample rear face $\mathbf{12}b=L_2+L_3+2L+2nt$ (6)

Here, as mentioned above, $$L_2=L_1+2L. \quad (7)$$

When this expression (7) is substituted for $L_2$ in the above-mentioned expressions (1) to (6), the reflected light from the sample surface 12*a* derived from the measurement light straightly advanced between the two half mirrors 4, 5 is found to totally equal the optical path length of the reflected light from the reference surface 11*a* of the measurement light having bypassed the straight path between the two half mirrors 4, 5.

On the other hand, the above-mentioned substitution reveals that an optical path length difference of at least 2 nt occurs between the reflected light from the sample surface 12*a* derived from the measurement light straightly advanced between the two half mirrors 4, 5 and the other kinds of reflected light.

Since the measurement light used in this embodiment is such that the coherence length Lc is smaller than 2 nt, the optical path length difference between the reflected light from the sample surface 12*a* and the other reflected light is not shorter than the coherence length.

Therefore, the reflected light from the sample surface 12*a* derived from the measurement light straightly advanced between the two half mirrors 4, 5 does not interfere with the reflected light other than that from the reference surface 11*a* derived from the measurement light having bypassed the straight path between the two half mirrors 4, 5, so that desirable noiseless interference fringes can be formed on the CCD within the imaging camera 14, whereby the surface form of the thin glass sheet can be measured with high accuracy.

Since the thickness may vary depending on the sample 12, it is desirable for the path-matching optical system to move the two total reflection mirrors 6, 7 integrally in a delicate manner, so that the optical path length of the bypassed measurement light can finely be adjusted.

Also, as depicted, a wavelength-selective filter plate 3 may be disposed between the collimator lens 2 and the half mirror 4 in this embodiment.

In the wavelength-selective filter plate 3, a whole wavelength transmitting part, a red light transmitting part, a green light transmitting part, and a blue light transmitting part are formed at intervals of 90° on a turret plate, so that a desirable color light component can be selected as measurement light when the turret plate is rotated by a predetermined angle. This is useful when light having a predetermined wavelength is required to be selected as measurement light, as in the case where the sample 12 is a dichroic mirror for reflecting light having a predetermined wavelength.

When such a wavelength-selective filter is totally unnecessary, the filter plate 3 may be moved in directions of arrow A in FIG. 1 so as to be retracted to the outside of the optical path as a matter of course. Also, such a wavelength-selective filter plate 3 itself may be omitted.

Preferably, in the path-matching passage 60, the optical path length difference between the straight path and the bypass is made variable. In this embodiment, the total reflection mirrors 6, 7 are integrally moved in directions in which the above-mentioned $l_1$ and $l_3$ equally increase and decrease, whereby the optical path length adjustment can easily be carried out after replacing the sample 12.

The high coherent luminous flux and the low coherent luminous flux can be guided so as to become coaxial with each other on the light source side of the path-matching passage 60. In this case, one of the two paths of the path-matching passage 60 is provided with a shutter member (light-shielding member) for preventing the high coherent luminous flux from passing when carrying out the high coherence measurement, so that the high coherent luminous flux passes through the other path alone.

The high coherent luminous flux may be guided into the optical path of the low coherent luminous flux in one of the paths of the path-matching passage 60. In this case, it is desirable that a member for blocking the low coherent luminous flux be inserted on the light source side of the path-matching passage 60 at the time of high coherence measurement. Also, any of the half mirrors 4, 5 and total reflection mirrors 6, 7, which are constituents of the path-matching passage 60, may be configured so as to guide the high coherent luminous flux.

The light source 1 for outputting the low coherent luminous flux may be a light source considered substantially equivalent to one outputting the low coherent luminous flux by using a wavelength-variable laser, which will be explained later. Namely, the light source may be one capable of wavelength scanning for causing laser light of a single longitudinal mode to oscillate, the laser light from the light source may be modulated into a plurality of wavelengths, and interference light generated by object light from the sample surface 12*a* and reference light from the reference surface 11*a* by using the laser light modulated into the plurality of wavelengths may be received by an imaging device and integrated for a light accumulation period.

When the optical path length difference between the two paths constituting the path-matching passage 60 is made variable as mentioned above, it is preferred that the optical path length be measurable by a micrometer, a laser length-measuring device, or the like.

When the optical path length difference between the two paths constituting the path-matching passage 60 is made variable as mentioned above, it is preferred that, for easier adjustment at the time of measurement, the focus of the imaging lens 13 be adjusted in synchronization therewith.

It is preferred that the apparatus of the present invention can measure not only flat samples but also spherical samples. When measuring a spherical sample, a reference lens having a spherical surface in conformity to the sample surface is used in place of the reference plate as will be explained later.

Without being restricted to the above-mentioned embodiment, the interferometer apparatus in accordance with the present invention can be modified in various manners. For example, in the path-matching optical system, a single cube corner reflector which can return the measurement light from the half mirror 4 toward the half mirror 5 may be employed in place of the two total reflection mirrors 6, 7 in the path-matching optical system.

Such a corner cube reflector facilitates moving operations for adjusting the optical path length of the bypassed measurement light.

The transmitted light and reflected light of the half mirror 4 may be exchanged so as to become the bypassed measurement light and advanced measurement light, respectively.

When supporting the sample 12 on the sample surface 12*a* side, supporting means for the sample 12 may have a structure for holding it by securing. When supporting the sample 12 on the rear face 12*b* side, it is desirable that the supporting means have a structure which can move the sample 12 along the optical axis according to the thickness of the sample 12. Preferably, in the latter case, the sample 12 is automatically moved such that the sample surface 12*a* shifts to an appropriate position according to thickness information of the sample 12 when attaining interference fringes.

In place of the half prism 9, a half mirror may be used. However, astigmatism can be made favorable when the half prism 9 is used in a divergent luminous flux as in this embodiment. Each of the half mirrors 4, 5 can be replaced by a half prism as a matter of course.

The sample for the interferometer apparatus in accordance with the present invention is not limited to the thin glass sheet, but may be various thin transparent sheets such as those made of plastics and silica.

Second Embodiment

Figure 2:
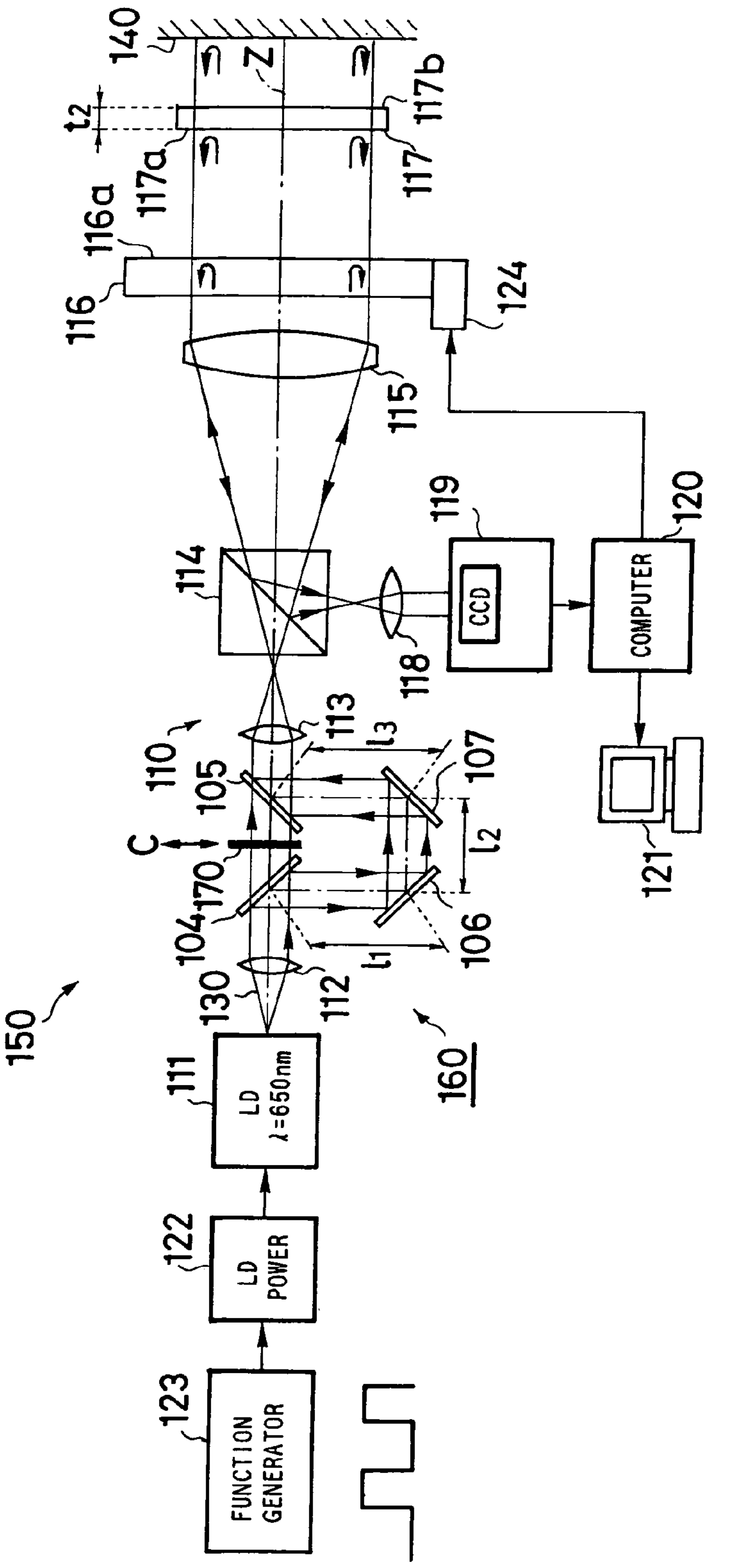
FIG. 2 is a schematic diagram showing the interferometer apparatus for both low and high coherence measurement in accordance with a second embodiment of the present invention.

FIG. 2 is a schematic view showing the interferometer apparatus for both low and high coherence measurement in accordance with a second embodiment.

This interferometer apparatus 150 carries out low and high coherence measurement by using a light source 111 which can selectively output low and high coherent luminous fluxes. Namely, low coherence measurement which can attain information (reflected wavefront information) such as the form of a surface 117*a* of a sample 117 is carried out by using the low coherent luminous flux from the light source 111, and high coherent measurement which can attain information (transmitted wavefront information) such as the stress strain and refractive index distribution within the sample 117 is carried out by using the high coherent luminous flux.

Switching between the low and high coherent luminous fluxes outputted from the light source 111 is carried out by an operation of changing the wavelength of output light from the light source 111.

Preferably, the operation of changing the wavelength of output light is carried out in synchronization with an operation of switching between the low coherence measurement and high coherence measurement performed by an operator from the outside.

Apparatus Configuration

As shown in FIG. 2, the interferometer apparatus 150 for both low and high coherence measurement comprises a Fizeau interferometer 110 for observing the surface form of the sample surface 117*a* of a transparent plane parallel glass sheet (sample with a thickness of $t_2$) 117 according to interference fringes, a computer 120, a monitor 121, a power supply (LD power supply) 122 for the semiconductor laser light source (LD) 111, and a function generator 123 for generating a control signal for regulating the output current value from the power supply (LD power supply) 122.

The interferometer 110 comprises a collimator lens 112 for turning coherent light from the semiconductor laser light source 111 into parallel light, a divergent lens 113, a half prism 114, a collimator lens 115, a reference plate 116 having a reference surface 116*a* opposing the sample 117 across a work space, and an imaging lens 118 and a CCD imaging apparatus 119 which capture interference fringes caused by optical interference.

In this embodiment, a path-matching optical system (hereinafter also referred to as path-matching passage 160), composed of two half mirrors 104, 105 and two total reflection mirrors 106, 107, for bypassing a part of the measurement light (with two paths) is inserted in a parallel luminous flux area between the collimator lens 130 and condenser lens 113 as in the above-mentioned first embodiment.

A part of the measurement light is perpendicularly reflected by the half mirror 104 so as to be separated from the rest of the measurement light. Thus reflected light component is perpendicularly reflected by the total reflection mirrors 106, 107 in succession, and then by the half mirror 105, so as to recombine with the rest of the measurement light. Here, the optical path length $L_2$ ($L_2=1_1+1_2+1_3$) of the bypassed measurement light from the half mirror 104 to the half mirror 105 is longer than the optical path length $L_1$ of the measurement light transmitted through the half mirror 104 between the half mirrors 104 and 105 by the length of $1_1+1_3$ ($1_1=1_3$), since the distance $L_1$ between the two half mirrors 104, 105 equals the distance between the two total reflection mirrors 106, 107. The length of $1_1+1_3$ is adjusted so as to equal twice the distance L between the reference surface 116*a* of the reference plate 116 and the sample surface 117*a* of the sample 117. Thus, the path-matching passage 160 is configured as with the path-matching passage 60 of the above-mentioned first embodiment.

At the time of low coherence measurement in the interferometer 110, laser light 130 from the semiconductor laser light source 111 is made incident on the reference surface 116*a* of the reference plate 116, so as to be divided into a transmitted luminous flux and a reflected luminous flux at the reference plane 116*a*. The transmitted luminous flux is made incident on the sample surface 117*a* of the plane parallel glass sheet 117, and the light reflected from the sample surface 117*a* is employed as object light. The reflected light from the reference surface 116*a* is employed as reference light. Interference light generated by optical interference between the object light and reference light is guided to the CCD imaging apparatus 119 by way of the collimator lens 115, half prism 114, and imaging lens 118, so that interference fringes are captured by the CCD imaging apparatus 119.

Thus captured interference fringes are analyzed by the computer 120, whereby the surface form of the sample surface 117*a* can be measured. The captured interference fringes and analyzed surface form of the sample surface 117*a* are displayed on the monitor 121.

At the time of high coherence measurement, on the other hand, the sample 117 is irradiated with the measurement light, and the part of light transmitted through the sample 117, reflected by a reference reflecting surface 140 positioned on the sample side thereof, and then transmitted through the sample 117 again so as to reach the reference surface 116*a* is utilized. Namely, as in the low coherence measurement, an interference fringe image is obtained according to interference light caused by respective reflected light components from the reference surface 116*a* of the reference plate 116 and the reference reflecting surface 140.

At the time of high coherence measurement, a shutter member 170 is detachably inserted in one of paths of the path-matching passage 160.

By way of a piezoelectric device 124 connected to a PZT driving circuit which is not depicted, the reference plate 116 is supported by a reference plate supporting member which is not depicted. According to an instruction from the computer 120, a predetermined voltage is applied to the piezoelectric device 124, so as to drive the piezoelectric device 124, whereby the reference plate 116 is moved by a predetermined phase along the optical axis Z. The image data of interference fringes changing upon this movement is outputted to the computer 120, and thus obtained plurality of sheets of image data are subjected to a fringe image analysis.

The high coherence measurement and low coherence measurement in the second embodiment will now be explained in succession.

High Coherence Measurement

For carrying out high coherence measurement by irradiating the sample 112 with the high coherent luminous flux outputted from the semiconductor laser light source 111, the output light from the light source 111 is initially set so as to be fixed at a predetermined wavelength (e.g., $\lambda$=660 nm at about 60 mW). Also, the shutter member 170 is moved in directions of arrow C, so as to be inserted into one of paths of the path-matching passage 160. Preferably, this operation of moving the shutter member 170 is carried out in synchronization with an operation of switching between low coherence measurement and high coherence measurement performed by an operator from the outside.

In this interferometer apparatus, the measurement light outputted from the semiconductor laser light source 111 is turned into parallel light by a collimator lens 112. The beam diameter of the parallel light is enlarged by the condenser lens 113 and the collimator lens 115. The transparent reference plate 116, the sample 117 made of a thin glass sheet, and the reference reflecting surface 140 are irradiated with the light having the enlarged beam diameter. Here, the reference surface 116*a* of the reference plate 116 and the reference reflecting surface 140 are disposed orthogonal to the optical axis Z, whereas the surfaces 117*a*, 117*b* of the sample 117 are slightly inclined with respect to the optical axis Z. As a consequence, the reflected light from the reference reflecting surface 140 goes back the incoming path, thereby interfering with the reflected light from the reference surface 116*a*. By contrast, respective reflected light components from the surfaces 117*a*, 117*b* of the sample 117 do not go back their entrance paths, and thus do not interfere with the reflected light from the reference surface 116*a*.

The interference light caused by respective reflected light components from the reference surface 116*a* and reference reflecting surface 140 is perpendicularly reflected by the half mirror surface of the half prism 114, so as to form an interference fringe image on the CCD within the imaging camera 119 by way of the imaging lens 118. According to interference image information obtained by the CCD upon photoelectric conversion, an interference fringe image is formed on the monitor 121 such as CRT by the computer 120.

The reflected light from the reference reflecting surface 140 passes through the sample 117 twice, and thus carries transmitted wavefront information within the sample, e.g., information about internal stress strain and refractive index distribution, whereby such transmitted wavefront information appears in the interference fringe image displayed on the monitor 121 such as CRT.

Low Coherence Measurement

When carrying out low coherence measurement by using the low coherent luminous flux outputted from the semiconductor laser light source 111 capable of changing the wavelength, the output light of the light source 111 is set so as to take two (or three or more) wavelength values alternately. Also, the shutter member 170 is moved in directions of arrow C, so as to be retracted from one of the paths of the path-matching passage 160. Preferably, this operation of moving the shutter member 170 is carried out in synchronization with an operation of switching between low coherence measurement and high coherence measurement performed by an operator from the outside.

A case where the low coherence measurement is carried out will now be explained while being focused on the semiconductor laser light source 111.

As the semiconductor laser light source 111, one equipped with a temperature control function is used, so as to be able to cause laser light having a single longitudinal mode (e.g., λ=about 660 nm) to oscillate. Further, the semiconductor laser light source 111 has a characteristic feature of a general semiconductor laser light source in that the wavelength and optical intensity of the output laser change when a current injected therein is altered.

The CCD imaging apparatus 119 uses a CCD having a light accumulation period of 1/30 second.

The control signal outputted from the function generator 123 is a rectangular wave (including stepwise rectangular waves), whose frequency is about 200 Hz, for example, so as to be set to such a speed that no flicker occurs when reproducing the image information captured by the CCD).

In the interferometer apparatus 150 for both low and high coherence measurement in this embodiment, the semiconductor laser light source 111 of a single longitudinal mode is used, so as to modulate the laser light outputted from the light source 111 into a plurality of wavelengths (e.g., wavelengths λ=660.00 nm and 660.01 nm) alternately in a period sufficiently shorter than a light accumulation period of the device (CCD of the CCD imaging apparatus 119) for receiving interference fringes, whereas the interference light from the sample 117 is received by the device and thereby integrated for the light accumulation period.

As mentioned above, the semiconductor laser light source has a characteristic feature in that its wavelength changes when the injection current is altered. Since the device for receiving interference fringes has a predetermined light accumulation period, effects similar to those in the case observing interference fringes by using a light source outputting a plurality of wavelengths of light at the same time can be obtained when scanning wavelengths at a speed sufficiently faster than the light accumulation period. Based on such findings, a technique for synthesizing coherence functions is disclosed in Preproceedings of Meeting on Lightwave Sensing Technology in May 1995, pp. 75–82. According to this technique, the injection current can be regulated by a control signal which is obtained by changing a rectangular wave like a ramp while making it up and down from a reference level (DC level).

The inventors have also disclosed a technique having improved the former technique (Japanese Patent Application No. 2002-192619).

The other techniques at the time of low coherence measurement are the same as those at the time of low coherence measurement in the above-mentioned first embodiment and thus will not be explained here.

Though the shutter member 170 is provided between the half mirrors 104 and 105, it may be disposed at other positions within the path-matching passage 160.

Third Embodiment

FIGS. 3A to 3D are views for explaining the interferometer apparatus for both low and high coherence measurement in accordance with a third embodiment of the present invention, which is configured so as to measure the radius of curvature of an optical device while using the basic configuration of the apparatus in accordance with the above-mentioned first or second embodiment.

Here, a sample 217 is an optical device having a sample surface 217*a* made of a concave face, whereas the radius of curvature of the concave face 217*a* is measured.

Therefore, a reference lens 216 is used in place of the reference plates 11, 116 employed in the above-mentioned first and second embodiments.

A procedure of measurement will now be explained with reference to FIGS. 3A to 3D.

Figure 3A:
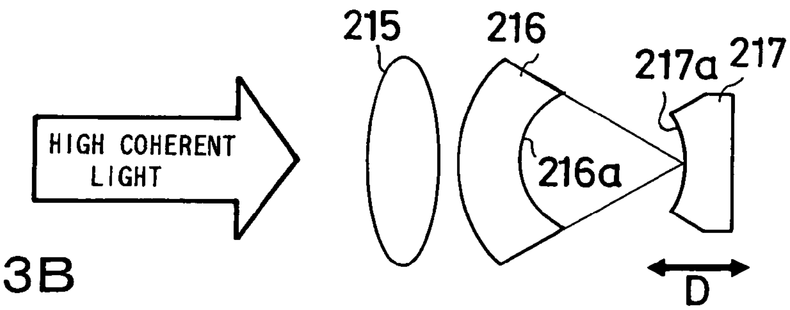
FIGS. 3A to 3D are views showing respective steps of measurement carried out by the interferometer apparatus for both low and high coherence measurement in accordance with a third embodiment of the present invention.

First, as shown in FIG. 3A, the sample surface 217*a* of the sample 217 is irradiated with a high coherent luminous flux as measurement light by way of a collimator lens 215 (corresponding to the above-mentioned collimator lenses 10, 115) and the reference lens 216.

In this state, interference fringes caused by respective reflected light components from the reference surface 216*a* of the reference lens 216 and the sample surface 217*a* of the sample 217 are found while moving the sample 217 in directions of arrow D, and a cat's-eye point where the number of interference fringes is minimized is sought. When the cat's-eye point is detected, the sample 217 is set at this position.

Figure 3B:
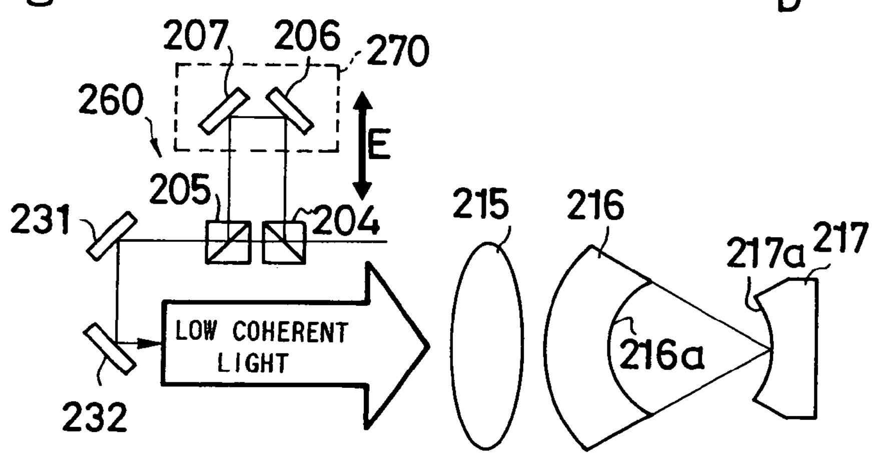

Subsequently, as shown in FIG. 3B, the measurement light is switched to a low coherent luminous flux, and the sample surface 217*a* of the sample 217 is irradiated with this low coherent luminous flux by way of the collimator lens 215 and the reference lens 216. Here, half prisms 204, 205 and total reflection mirrors 206, 207 constitute a path-matching passage 260, whereas two total reflection mirrors 231, 232 are disposed between the path-matching passage 260 and the collimator lens 215.

In this state, while integrally moving the total reflection mirrors 206, 207 (which will hereinafter be referred to as a movable mirror unit 270) of the path-matching passage 260 in directions of arrow E, interference fringes displayed on the monitor 121 are observed, and a contrast peak position where the contrast of interference fringes is maximized is sought. When this contrast peak position is detected, the position of the movable mirror unit 270 (first scale) at that time is read.

Figure 3C:
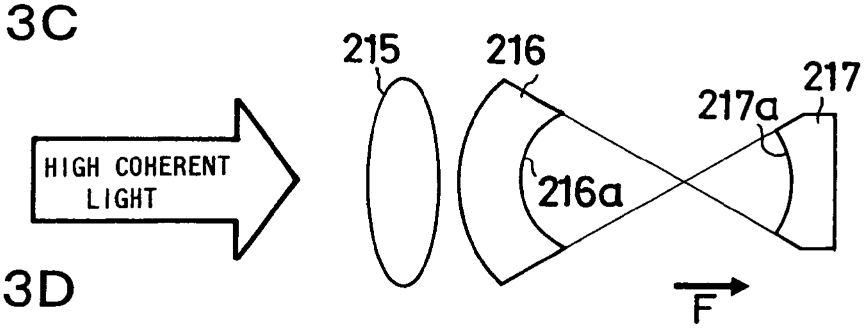

Then, as shown in FIG. 3C, the measurement light is switched to the high coherent luminous flux, and the sample surface 217*a* of the sample 217 is irradiated with the high coherent luminous flux by way of the collimator lens 215 and the reference lens 216. In this state, the sample 217 is moved in the direction of arrow F, so as to be set such that interference fringes formed by respective reflected light components from the reference surface 216*a* of the reference lens 216 and the sample surface 217*a* of the sample 217 appear on the monitor 121, and further to a position where the number of interference fringes is minimized.

Figure 3D:
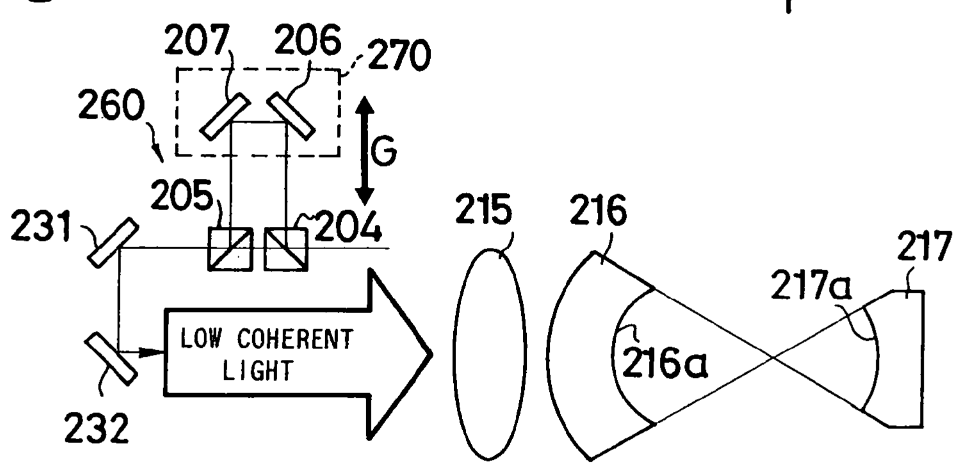

Thereafter, as shown in FIG. 3D, the measurement light is switched to the low coherent luminous flux, and the sample surface 217*a* of the sample 217 is irradiated with the low coherent luminous flux. In this state, while moving the movable mirror unit 270 in directions of arrow G, interference fringes displayed on the monitor 121 are observed, and a contrast peak position where the contrast of interference fringes is maximized is sought. When this contrast peak position is detected, the position of the movable mirror unit 270 (second scale) at that time is read.

Finally, the difference between the first and second scales obtained by the foregoing process is calculated, and the radius of curvature of the sample surface 217*a* of the sample 217 is obtained from the result of calculation.

Since the position adjusting operation for the sample 217 (operation in the steps shown in FIGS. 3A and 3C) is carried out by using the high coherent luminous flux before the operation of detecting individual positions (operation in the steps shown in FIGS. 3B and 3D) by using the low coherent luminous flux, the measuring operation can be performed rapidly in an easy manner. Such an operation is realized since, as mentioned above, the basic configuration of the apparatus comprises a high coherence measuring system and a low coherence measuring system which are coaxial with each other, so that the low coherent luminous flux and the high coherent luminous flux can smoothly be switched therebetween for measurement.

While the position of the movable mirror unit 270 can be measured by a micrometer, a laser length-measuring device, or the like as mentioned above, the moving distance or angular deviation of the movable mirror unit can be detected by using the interferometer apparatus, and the reading position may be calibrated according to thus detected value.

Though this embodiment relates to the case measuring the sample surface 217*a* made of a concave face, the apparatus of the present invention can similarly be employed for measuring the thickness of a flat sheet or the distance between members.

Fourth Embodiment

Figure 4A:
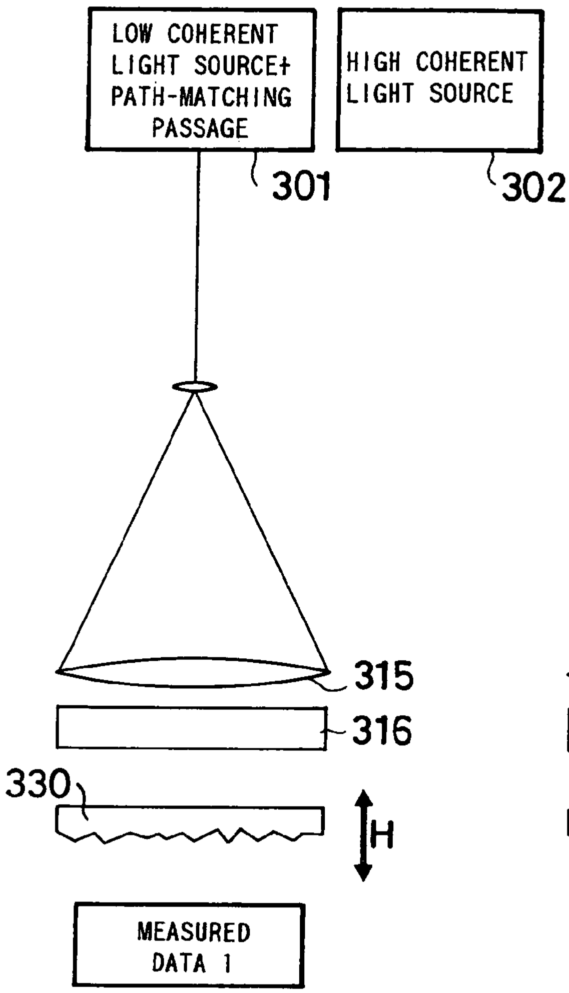
FIGS. 4A and 4B are views for explaining the measuring method using the interferometer apparatus for both low and high coherence measurement in accordance with a fourth embodiment of the present invention.
Figure 4B:
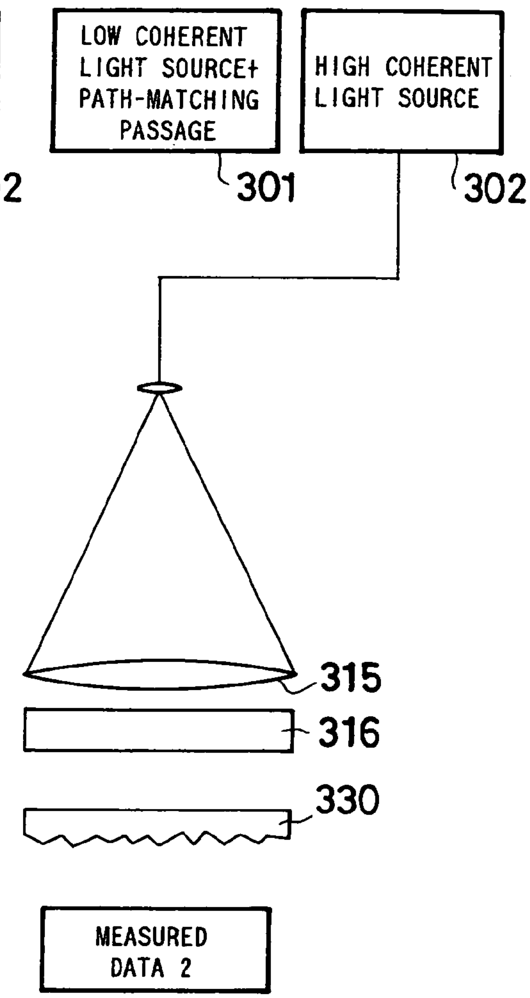

FIGS. 4A and 4B are views for explaining a measuring method using an interferometer apparatus for both low and high coherence measurement in accordance with a fourth embodiment, which is configured so as to calibrate a system error in the path-matching passage 60, 160 occurring when using a low coherent light source while employing the basic configuration of the apparatus in accordance with the first or second embodiment.

With reference to FIGS. 4A and 4B, a calibrating procedure will now be explained.

First, as shown in FIG. 4A, a calibration sample 330 is set on a stage (not depicted) and is irradiated, by way of a collimator lens 315 and a reference plate 316, with a low coherent luminous flux transmitted through a path-matching passage (both of the two branching paths) after being emitted from a low coherent light source (both of the low coherent light source and path-matching passage being referred to with 301).

In this state, the calibration sample 330 is moved in directions of arrow H (along the optical axis), so as to generate interference fringes. The interference fringes are measured, and the result of measurement is defined as measured data 1.

Subsequently, as shown in FIG. 4B, the measurement light is switched to a high coherent luminous flux (a high coherent light source being referred to with 302 here), and the calibration sample 330 is irradiated, by way of the collimator lens 315 and the reference plate 316, with the high coherent luminous flux. Interference fringes generated in this state are measured, and the result of measurement is defined as measured data 2. The resulting measured data 2 has not branched off in the path-matching passage, and thus can be considered to be free of system errors in the path-matching passage. Therefore, the measured data 2 is taken as a reference for the calibration.

Next, an arithmetic operation for subtracting the measured data 2 from the measured data 1 is carried out by a computer which is not depicted, and the result of the arithmetic operation is taken as a system error of the path-matching passage.

When carrying out low coherence measurement thereafter, a correcting operation for subtracting the system error obtained by the above-mentioned arithmetic operation from the result of measurement is carried out, so as to calibrate the measured data.

In the case where the low and high coherent luminous fluxes have respective wavelengths different from each other, the system error is determined while taking account of this difference as well.

In the case where an absolute form of the reference surface 316 has been obtained, the measured data is calibrated while taking account of the error caused by this absolute form (system error of the reference surface) as well.

This embodiment can easily calibrate the system error of the path-matching passage as such, and thus can finally attain highly accurate, reliable measured data.

In this embodiment, the low and high coherent light sources may be separated from each other as in the first embodiment, or may be a single light source as in the second embodiment.

Fifth Embodiment

Figure 5:
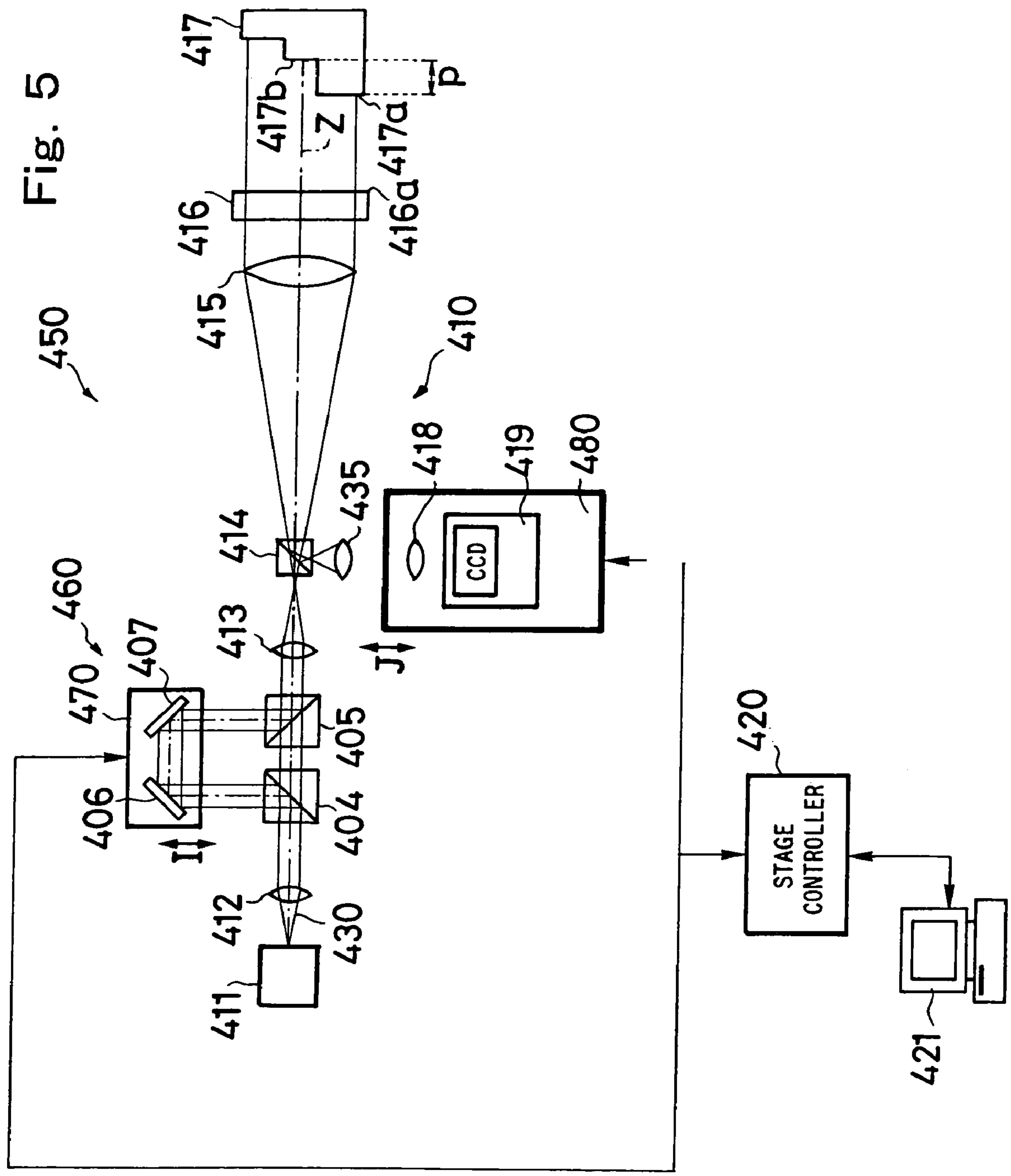
FIG. 5 is a schematic diagram showing the interferometer apparatus for both low and high coherence measurement in accordance with a fifth embodiment of the present invention.

FIG. 5 is a diagram showing the interferometer apparatus for both low and high coherence measurement in accordance with a fifth embodiment of the present invention. Since the apparatus of this embodiment is based on the apparatus in accordance with the first embodiment shown in FIG. 1 or the apparatus in accordance with the second embodiment shown in FIG. 2, members shown in FIG. 5 having functions substantially the same as those of members shown in FIG. 2 will be referred to with numerals adding 300 to those of members shown in FIG. 2, and thus will not be explained in detail.

In the apparatus shown in FIG. 5, two total reflection mirrors 406, 407 constituting a path-matching passage 460 are mounted on a first X stage 470 movable in directions of arrow I, whereas an imaging lens 418 (on which a coherent luminous flux divided by a half prism 414 and passed through a relay lens 435 is incident) and a CCD imaging apparatus 419 are mounted on a second X stage 480 movable in directions of arrow J. At the time of measurement after initial setting which will be explained later, the two X stages 470, 480 are moved in synchronization with each other by a stage controller 420 according to an instruction from a computer 421. (In practice, respective driving motors of the X stages 470, 480 are driven by the stage controller 420.) As a light source 411, one capable of outputting a low coherent luminous flux, e.g., the above-mentioned SLD (superluminescent diode), is used. While this embodiment is applicable to both of an apparatus equipped with a plurality of light sources such as that of the above-mentioned first embodiment and an apparatus having a single light source such as that of the second embodiment, only measurement using a low coherent luminous flux outputted from the light source 411 will be explained in the following without detailing (and depicting) a high coherent luminous flux.

For example, the initial setting for a sample 417 having a stepped form as depicted is such that interference fringes are generated by respective reflected light components from a reference surface 416*a* and a first sample surface 417*a*. Namely, in the initial setting, the first X stage 470 is moved in directions of arrow I with respect to the first sample surface 417*a* disposed at a given position, for example, so as to be set at a position where interference fringes are generated by the two surfaces 416*a*, 417*a* mentioned above. Subsequently, the second X stage 480 is moved in directions of arrow J, so as to be set at a position in focus. Here, the two X stages 470, 480 are driven so as to move independently of each other.

When such an initially set state shifts to a state for observing interference fringes with a second sample surface 417*b*, the distance between the two surfaces for generating interference fringes increases by p (the optical path length of light irradiating the sample surface increases by 2p), where p is the distance between the first sample surface 417*a* and the second sample surface 417*b*. Therefore, no interference fringes occur unless the optical path length difference between two paths of the path-matching passage 460 increases by 2p.

Hence, the first X stage 470 is moved by p in a direction of arrow I, so as to increase the optical path length difference between the two paths by 2p. Then, in response to the movement of the first X stage 470, the second X stage 480 is automatically controlled by the stage controller 420 according to an instruction from the computer 421 so as to move to an in-focus position of the imaging system. Here, the amount of movement of the second X stage 480 in a direction of arrow J is $p/\alpha$, where $\alpha$ is a coefficient determined by optical designing.

The amount of movement of the second X stage is calculated by the computer 421. The above-mentioned coefficient $\alpha$ has been stored in a memory of the computer 421 beforehand. When the amount of movement p of the first X stage 470 is inputted from the stage controller 420, the computer 421 calculates $p/\alpha$. According to thus calculated value, the stage controller 420 moves the second X stage 480 by $p/\alpha$.

Though the foregoing relates to a case where the movement of the second X stage 480 is automatically regulated in response to the movement of the first X stage 470, the movement of the first X stage 470 may automatically be controlled in response to the movement of the second X stage 480.

The relationship between respective amounts of movement of the two X stages 470, 480 may be stored as a table in a memory of the computer 421 beforehand, and the above-mentioned control may be carried out according to this table.

Though the CCD imaging apparatus 419 is mounted on the second X stage 480 in the foregoing, a focus adjusting device accompanying the CCD imaging apparatus 419 may be used in place of the second X stage 480.

Thus, the apparatus of this embodiment is configured such that the optical adjustment for generating interference fringes in a desirable sample surface and the focus adjustment of an imaging system are automatically carried out in synchronization with each other, whereby viewing of interference fringes in each region of sample surfaces having steps or the like can be carried out favorably in an easy manner in particular.

Without being restricted to the above-mentioned embodiments, the interferometer apparatus of the present invention can be modified in various manners. For example, the surface (rear face 17*b*) of the sample 17 on the opposite side of the reference surface 16*a* can be used as the sample surface 17*a*.

The interferometer apparatus of the present invention can also be configured as an oblique incidence type apparatus as a matter of course.

The light source is not limited to a semiconductor laser light source, whereas other laser light sources can also be used. A light source adapted to switch between continuous-wave laser light (for a high coherent luminous flux) and pulsed wave laser light (for a low coherent luminous flux) can also be used. The oscillation wavelength of laser light may be changed not only by altering the injection current, but by other techniques such as changing of the resonance frequency of an external resonator, for example.

The interferometer apparatus of the present invention explained in the foregoing is an interferometer apparatus for both low and high coherence measurement, the interferometer apparatus being of Fizeau type adapted to irradiate a reference surface with light from a light source, irradiate a sample separated by a predetermined distance from the reference surface with light transmitted through the reference surface, and yield wavefront information of the sample according to interference of light between the reference surface and the sample. In this interferometer apparatus, when carrying out low coherence measurement by using a low coherent luminous flux outputted from the light source, the sample is interferentially measured such that the low coherent luminous flux is passed through a path-matching passage for dividing the low coherent luminous flux into first and second paths, while the optical path length difference between the respective luminous fluxes passed through the two paths equals twice the optical distance between the reference surface of the interferometer apparatus and the sample. When carrying out high coherence measurement by using a high coherent luminous flux outputted from the light source, on the other hand, the high coherent luminous flux is made incident on at least the sample side of the path-matching passage at a position coaxial with the low coherent luminous flux, while the reference surface and the sample are irradiated with the high coherent luminous flux.

Therefore, when measuring the form of a sample surface, a low coherent luminous flux passed through the path-matching passage is used, whereby a noiseless clear interference fringe image can be obtained while preventing interference fringes from being generated by reflected light from the sample rear face. When measuring a transmitted wavefront form of a transparent sample, on the other hand, measurement can be effected rapidly in an easy manner by using a high coherent luminous flux. When switching between these measurement operations, it is not necessary to move the reference plate and the sample, whereby low coherence measurement and high coherence measurement can be carried out continuously in a quite easy manner.

Also, when measuring a length with high accuracy, the interferometer apparatus for both low and high coherence measurement in accordance with the present invention can easily carry out high coherence measurement before low coherence measurement, thereby greatly alleviating the labor to find a position where interference fringes emerge or their contrast peak position.

What is claimed is:

1. An interferometer apparatus for both low and high coherence measurement, the interferometer apparatus being of Fizeau type adapted to irradiate a reference surface with light from a light source, irradiate a sample separated by a predetermined distance from the reference surface with light transmitted through the reference surface, and yield wavefront information of the sample according to interference of light between the reference surface and the sample;

wherein, when carrying out low coherence measurement by using a low coherent luminous flux outputted from the light source, the sample is interferentially measured such that the low coherent luminous flux is passed through a path-matching passage for dividing the low coherent luminous flux into first and second paths, while the optical path length difference between the respective luminous fluxes passed through the two paths equals twice the optical distance between the reference surface of the interferometer apparatus and the sample; and wherein, when carrying out high coherence measurement by using a high coherent luminous flux outputted from the light source, the sample is interferentially measured such that the high coherent luminous flux is made incident on at least the sample side of the path-matching passage at a position coaxial with the low coherent luminous flux, while the reference surface and the sample are irradiated with the high coherent luminous flux.

2. An interferometer apparatus according to claim 1, wherein the light source comprises a first light source unit for emitting the low coherent luminous flux and a second light source unit for emitting the high coherent luminous flux; and wherein a luminous flux switching operation for preventing the sample from being irradiated with the high coherent luminous flux is performed when carrying out the low coherence measurement.

3. An interferometer apparatus according to claim 2, wherein the first light source comprises a superluminescent diode.

4. An interferometer apparatus according to claim 2, wherein light-deflecting means for guiding interference light toward imaging means is disposed between the path-matching passage and the reference surface; and wherein the luminous flux switching operation is effected by luminous flux selecting means disposed between the first light source unit and the light-deflecting means, the luminous flux selecting means allowing the sample to be irradiated with the high coherent luminous flux alone when carrying out the high coherence measurement and allowing the sample to be irradiated with the low coherent luminous flux alone when carrying out the low coherence measurement.

5. An interferometer apparatus according to claim 1, wherein the high coherent luminous flux and the low coherent luminous flux pass a common optical path on the light source side of the path-matching passage; and wherein one of the first and second paths of the path-matching passage is provided with a light-shielding member for preventing the luminous flux from passing when carrying out the high coherence measurement.

6. An interferometer apparatus according to claim 1, wherein the light source comprises a first light source unit for emitting the low coherent luminous flux and a second light source unit for emitting the high coherent luminous flux; and wherein luminous flux selecting means integrated with a reflecting member for guiding one of the high and low coherent luminous fluxes into the optical path of the other and a light-shielding member for blocking the other luminous flux is detachably inserted in the optical path, the luminous flux selecting means being disposed between light-deflecting means for emitting the interference light toward imaging means and the path-matching passage, the light-deflecting means being disposed between the path-matching passage and the reference surface.

7. An interferometer apparatus according to claim 6, wherein the first light source comprises a superluminescent diode.

8. An interferometer apparatus according to claim 1, wherein the light source comprises a single light source unit for emitting both the low coherent luminous flux and the high coherent luminous flux; and wherein one of the first and second paths of the path-matching passage is provided with a light-shielding member for preventing the luminous flux from passing when carrying out the high coherence measurement.

9. An interferometer apparatus according to claim 1, wherein at least a light source for outputting the low coherent luminous flux is capable of wavelength scanning for causing laser light of a single longitudinal mode to oscillate;

wherein the laser light from the light source is modulated into a plurality of wavelengths in a period sufficiently shorter than a light accumulation period of a device for receiving interference fringes; and wherein the reference surface and the sample are irradiated with measurement light comprising the laser light modulated into the plurality of wavelengths; interference light generated by light from the sample and light from the reference surface is received by the device; and the interference light is integrated for the light accumulation period.

10. An interferometer apparatus according to claim 1, wherein the optical path length difference between the two paths constituting the path-matching passage is variable and measurable.

11. An interferometer apparatus according to claim 1, further comprising optical path length difference changing means for changing the optical path length difference between the two paths constituting the path-matching passage; focus position adjusting means for adjusting a focus position of an imaging system for capturing interference fringes caused by light from the reference surface and sample; and control means for driving the optical path length changing means and focus position adjusting means in synchronization with each other such that both the optical path length difference and focus position attain respective optimal values.

12. An interferometer apparatus according to claim 1, wherein the interferometer apparatus is adapted to measure any of planar and spherical samples.

13. A measuring method in the interferometer apparatus for both low and high coherence measurement adapted to measure a spherical sample according to claim 12, the method successively comprising:

a first step of irradiating the sample with the high coherent luminous flux as measurement light by way of the reference surface of a reference lens in the interferometer apparatus, moving the sample along an optical axis in thus irradiated state so as to detect a position yielding a minimum number of interference fringes caused by light from the reference surface and sample, and setting the sample at thus detected position;

a second step of switching the measurement light to the low coherent light, irradiating the sample with the low coherent light by way of the reference surface of the reference lens, changing the optical path length difference between the respective luminous fluxes passed through the two paths of the path-matching passage so as to detect a contrast peak position yielding a maximum contrast in interference fringes obtained, and determining a first adjustment amount as an adjustment amount of means for adjusting the optical path length difference at the time of detection;

a third step of irradiating the sample with the high coherent luminous flux as the measurement light by way of the reference surface of the reference lens, moving the sample along the optical axis in thus irradiated state so as to detect a position yielding a minimum number of interference fringes caused by light from the reference surface and sample, and setting the sample at thus detected position;

a fourth step of switching the measurement light to the low coherent light, irradiating the sample with the low coherent light by way of the reference surface of the reference lens, changing the optical path length difference between the respective luminous fluxes passed through the two paths of the path-matching passage so as to detect a contrast peak position yielding a maximum contrast in interference fringes obtained, and determining a second adjustment amount as an adjustment amount of means for adjusting the optical path length difference at the time of detection; and a fifth step of calculating a difference between the first adjustment amount obtained by the second step and the second adjustment amount obtained by the fourth step, and attaining curvature information of the sample according to a result of calculation.

* * * * *